United States Patent
Ebert et al.

(10) Patent No.: US 12,466,742 B2
(45) Date of Patent: Nov. 11, 2025

(54) PRODUCTION OF $MoO_2Cl_2$

(71) Applicant: SK Specialty Co., Ltd., Yeongju-si (KR)

(72) Inventors: Timo Ebert, Linsengericht (DE); Annika Frey, Hanau (DE); Nicholas Rau, Marburg (DE); Wolf Schorn, Waldbronn (DE); Ralf Karch, Kleinostheim (DE); Eileen Woerner, Nidderau (DE); Angelino Doppiu, Seligenstadt (DE)

(73) Assignee: SK SPECIALTY CO., LTD., Yeongju-si (KR)

( * ) Notice: Subject to any disclaimer, the term of this patent is extended or adjusted under 35 U.S.C. 154(b) by 145 days.

(21) Appl. No.: 17/642,688

(22) PCT Filed: Dec. 2, 2021

(86) PCT No.: PCT/EP2021/083966
§ 371 (c)(1),
(2) Date: Jun. 30, 2022

(87) PCT Pub. No.: WO2022/135866
PCT Pub. Date: Jun. 30, 2022

(65) Prior Publication Data
US 2024/0083766 A1    Mar. 14, 2024

(30) Foreign Application Priority Data
Dec. 23, 2020  (EP) ..................... 20020649

(51) Int. Cl.
*C01G 39/00*   (2006.01)
*B01D 7/00*    (2006.01)

(52) U.S. Cl.
CPC ............. *C01G 39/00* (2013.01); *B01D 7/00* (2013.01); *C01P 2006/40* (2013.01); *C01P 2006/80* (2013.01)

(58) Field of Classification Search
CPC ....... C01G 39/00; B01D 7/00; C01P 2006/40; C01P 2006/80
See application file for complete search history.

(56) References Cited

U.S. PATENT DOCUMENTS

| | | | |
|---|---|---|---|
| 3,406,007 A | 10/1968 | Steen et al. | |
| 10,287,177 B1 | 5/2019 | Ten | |
| 10,710,896 B2 | 7/2020 | Li et al. | |
| 11,066,310 B2 | 7/2021 | Li et al. | |
| 11,806,677 B2 | 11/2023 | Tarutani et al. | |
| 2019/0330077 A1 | 10/2019 | Li et al. | |
| 2020/0131628 A1 | 4/2020 | Baum et al. | |
| 2020/0299147 A1 | 9/2020 | Li et al. | |
| 2021/0009436 A1* | 1/2021 | Takahashi | C01G 39/00 |
| 2021/0053839 A1 | 2/2021 | Takahashi | |
| 2021/0101089 A1 | 4/2021 | Tarutani et al. | |

FOREIGN PATENT DOCUMENTS

| | | | |
|---|---|---|---|
| CN | 102632245 A † | 8/2012 | |
| EP | 3656741 A1 | 5/2020 | |
| EP | 3738928 A1 | 11/2020 | |
| FR | 1383849 A | 1/1965 | |
| JP | 06-093314 A | 4/1994 | |
| JP | 2019-104659 A | 6/2019 | |
| TW | 202017047 A | 5/2020 | |
| WO | 2019/213115 A1 | 11/2019 | |
| WO | 2020/021786 A1 | 1/2020 | |
| WO | 2020/084852 A1 | 4/2020 | |
| WO | 2020086344 A1 † | 4/2020 | |
| WO | 2021/171742 A1 | 9/2021 | |

OTHER PUBLICATIONS

International Preliminary Report on Patentability received for PCT Patent Application No. PCT/EP2021/083966, mailed on Jul. 6, 2023, 13 pages (7 pages of English Translation and 6 pages of Original Document).

(Continued)

*Primary Examiner* — Anthony J Zimmer
*Assistant Examiner* — Abdul-Rahman Yusuf Waleed Smari
(74) *Attorney, Agent, or Firm* — Hauptman Ham, LLP

(57) ABSTRACT

The invention relates to a method for producing $MoO_2Cl_2$ under inert conditions, comprising the steps of:
(i) charging a reaction vessel with $MoO_2$,
(ii) reacting the $MoO_2$ with supplied $Cl_2$ in the reaction vessel at a first temperature $T_1$ to give gaseous $MoO_2Cl_2$,
(iii) transferring the gaseous $MoO_2Cl_2$ into a receiving vessel,
(iv) resublimating the gaseous $MoO_2Cl_2$ in the receiving vessel to give solid $MoO_2Cl_2$ at a second temperature $T_2$ that is lower than $T_1$, and
(v) recovering solid $MoO_2Cl_2$ with a purity determined by ICP-OES/MS of 99.9996 wt. % or more.

The invention also relates to high-purity $MoO_2Cl_2$, the use thereof, and electronic components.

11 Claims, No Drawings

(56) References Cited

OTHER PUBLICATIONS

Office Action received for Taiwan Patent Application No. TW 110142578, mailed on Feb. 22, 2024, 10 pages of English Translation Only.
Third Party Observation received for European Patent Application No. 21819495.9 , mailed on Feb. 23, 2024, 14 pages.
Office Action dated Sep. 26, 2024 for corresponding Chinese Patent Application No. 202180082125.1, along with an English translation (13 pages).
Office Action dated Oct. 1, 2024 for corresponding Japanese Patent Application No. 2023-550718, along with an English translation (5 pages).
Jeyakumar, Kandasamy et al., "Application of molybdenum(VI) dichloride dioxide (MoO2Cl2) in organic transformations", Journal of Chemical Sciences, vol. 121, No. 2, Mar. 2009, pp. 111-123.
Graham et al.,: "Heats of formation of molybdenum oxychlorides", J.Phys. Chem., vol. 63, No. 5, pp. 723-724.
International Search Report and Written Opinion received for PCT Patent Application No. PCT/EP2021/083966, mailed on Feb. 9, 2022, 12 pages of Original Document Only.
Schrock et al., "Synthesis of Molybdenum Imido Alkylidene Complexes and Some Reactions Involving Acyclic Olefins", J. Am. Chem. Soc., vol. 112, 1990, pp. 3875-3886.

\* cited by examiner
† cited by third party

PRODUCTION OF $MoO_2Cl_2$

CROSS-REFERENCE TO RELATED APPLICATIONS

This application is a national stage application (under 35 U.S.C. § 371) of PCT/EP2021/083966, filed Dec. 2, 2021, which claims benefit of European Application No. 20020649.8, filed Dec. 23, 2020, both of which are incorporated herein by reference in their entirety.

The invention relates to methods for producing molybdenum dioxide dichloride ($MoO_2Cl_2$) and to $MoO_2Cl_2$ obtainable by such methods, to the use thereof and to electronic components.

PRIOR ART

Molybdenum-containing layers are frequently used in electronic components, for example in so-called flash memories. Such molybdenum-containing layers are often produced by means of vapor deposition. In such a vapor deposition, $MoO_2Cl_2$ is increasingly being used as a precursor for the molybdenum. In order to achieve advantageous electronic properties of the molybdenum-containing layers, the use of particularly pure $MoO_2Cl_2$ is desirable. In particular, the $MoO_2Cl_2$ should be as free as possible of metal impurities which can impair the electronic properties. A particular focus here lies on tungsten as an impurity, since tungsten can particularly impair the electronic properties of a molybdenum-containing layer. Accordingly, an $MoO_2Cl_2$ that is as tungsten-free as possible is particularly desirable.

The production of $MoO_2Cl_2$ is known per se. For example, Schrock et al. (J. Am. Chem. Soc., 1990, 112, 3875-3886) describe the production of $MoO_2Cl_2$ from molybdenum(IV) oxide ($MoO_2$) and chlorine gas ($Cl_2$). The reaction in the reaction vessel takes place at 160° C. A further active temperature setting of the test apparatus does not take place. The $Cl_2$ gas flow set is not specified, and the purity of the $MoO_2Cl_2$ produced is not determined.

A method for the preparation of molybdenum powder is known from CN 102632245 A, in which $MoO_2Cl_2$ is formed as an intermediate by reacting $MoO_2$ with $Cl_2$. No information is given regarding the atmosphere under which the reaction is carried out. No information is given regarding the purity of the $MoO_2Cl_2$ produced as an intermediate, either. The $MoO_2Cl_2$ produced as an intermediate is subsequently reacted with aqueous ammonia to give ammonium paramolybdate. This is converted into molybdenum(VI) oxide ($MoO_3$), from which molybdenum powder is ultimately obtained.

EP 3 656 741 A1 discloses a method for the production of molybdenum oxide chlorides from a molybdenum oxide and $Cl_2$ under reduced pressure. In addition to $MoO_2Cl_2$, the molybdenum oxide chlorides produced also comprise molybdenum oxide trichloride ($MoOCl_3$) and molybdenum oxide tetrachloride ($MoOCl_4$). In the exemplary embodiments, $MoO_2Cl_2$ is produced by reacting $MoO_3$ with $Cl_2$. The purity of the $MoO_2Cl_2$ produced is limited to 99.9995 wt. %.

The methods used in the prior art for producing $MoO_2Cl_2$ are in some cases still in need of improvement.

OBJECT OF THE INVENTION

The invention is based on the object of providing a method for producing $MoO_2Cl_2$ which, at least partially, and as fully as possible, overcomes the disadvantages of the prior art.

It is a particular object of the invention to provide a method for producing $MoO_2Cl_2$, which method gives particularly pure $MoO_2Cl_2$, in particular $MoO_2Cl_2$ with a low tungsten content.

The invention is also based on the object of providing a method for producing a molybdenum-containing layer which, at least partially, and as fully as possible, overcomes the disadvantages of the prior art.

It is furthermore an object of the invention to provide $MoO_2Cl_2$ which at least partially, and as fully as possible, overcomes the disadvantages of the prior art and in particular to provide $MoO_2Cl_2$ with improved purity.

It is also an object of the invention to provide the use of $MoO_2Cl_2$ as a precursor for producing a molybdenum-containing layer, which at least partially, and as fully as possible, overcomes the disadvantages of the prior art.

It is also an object of the invention to provide an electronic component having a molybdenum-containing layer, which at least partially, and as fully as possible, overcomes the disadvantages of the prior art.

DISCLOSURE OF THE INVENTION

Surprisingly, the objects of the invention are achieved by methods, products and uses according to the patent claims.

The invention relates to a method for producing $MoO_2Cl_2$ under inert conditions, comprising the steps of:
(i) charging a reaction vessel with $MoO_2$,
(ii) reacting the $MoO_2$ with supplied $Cl_2$ in the reaction vessel at a first temperature $T_1$ to give gaseous $MoO_2Cl_2$,
(iii) transferring the gaseous $MoO_2Cl_2$ into a receiving vessel,
(iv) resublimating the gaseous $MoO_2Cl_2$ in the receiving vessel to give solid $MoO_2Cl_2$ at a second temperature $T_2$ that is lower than $T_1$, and
(v) recovering solid $MoO_2Cl_2$ with a purity determined by ICP-OES/MS of 99.9996 wt. % or more.

The method according to the invention is carried out under inert conditions and is preferably carried out continuously under inert conditions. Except for the $Cl_2$ supplied in step (ii), the method is thus carried out excluding other reactive gases or substances. Accordingly, the method is preferably carried out excluding oxygen and/or excluding air and/or excluding water. The method is particularly preferably carried out in an atmosphere of pure $Cl_2$ or in an atmosphere of a $Cl_2$—$N_2$ mixture.

The method according to the invention is furthermore carried out with $MoO_2$ as the only molybdenum-containing and/or the only oxidic starting material. In particular, no other molybdenum oxide, such as MoO or $MoO_3$, is used in the method according to the invention. However, the $MoO_2$ charge may contain impurities, in particular metal impurities such as tungsten (W). It is also preferred according to the invention that, in addition to $MoO_2Cl_2$, no other molybdenum oxide chloride is produced in the method according to the invention, in particular no $MoOCl_3$ and/or no $MoOCl_4$.

The purity of the $MoO_2Cl_2$ recovered in step (v) is determined by means of coupled ICP-OES/MS. An inductively coupled plasma (ICP) is used as the excitation source. Firstly, the $MoO_2Cl_2$ is introduced into an inert gas flow (e.g. argon stream), to which high-frequency energy is then transmitted electrodelessly by inductive coupling. The frequencies used for this purpose are typically in the range of 25 and 100 MHz. The generators used typically have powers of between 1 and 10 kW. The inert gas flow is heated to temperatures of typically up to 10,000 K. The $MoO_2Cl_2$ is atomized or ionized as a result. The resulting free atoms and/or ions are analyzed optically by means of atomic emission spectrometry (OES, Optical Emission Spectrometry) as well as by mass spectrometry (MS).

Elements in solutions can generally be detected and quantified by means of optical emission spectrometry with inductively coupled plasma (ICP-OES, also ICP-AES, ICP-atomic spectrometry). The solution to be measured is vaporized as described above and the aerosol formed is introduced into a high-frequency plasma in which the solution components are atomized and partially ionized. The characteristic emission lines of the atoms and ions are decomposed with a monochromator or polychromator and the line intensities are detected with a suitable detector. The measurement can be carried out axially and/or radially. According to the invention, the measurement is preferably carried out axially, since the axial measurement is more sensitive. For quantitative determination, a calibration can be carried out with suitable standard solutions since there is a linear correlation between the signal intensities of the emission and the concentrations of an element. According to the invention, it is preferred that the measuring principle of the ICP-OES complies with DIN EN ISO 11885 (1997)/DEV E22 and/or the guidelines for chemical analysis, determination of elemental composition in environmental samples by ICP-OES, Fraunhofer-Institut für Molekularbiologie und Angewandte Oekologie [*Fraunhofer Institute for molecular biology and applied ecology*], Auf dem Aberg 1, D-57392 Schmallenberg, Germany.

Elements in solutions can generally be detected and quantified by means of mass spectrometry with inductively coupled plasma (ICP-MS). The solution to be measured is vaporized as described above and introduced into a high-frequency plasma in which the solution components are atomized and ionized. The ions are extracted from the high-frequency plasma by a pinhole aperture system and separated according to their mass-to-charge ratio. After separation, they are registered in a detector and the resulting signals are evaluated using the device software. A quantitative determination is possible after calibration with standard solutions, since there is a linear correlation between the signal intensities of the ions and the concentrations of an element. According to the invention, it is preferred that the measuring principle of the ICP-MS complies with DIN EN ISO 17294-2:2017-01 (Water quality—Application of inductively coupled plasma mass spectrometry (ICP-MS)—Part 2: Determination of selected elements, including uranium isotopes (ISO 17294-2:2016); German version EN ISO 17294-2:2016) and/or the guidelines for chemical analysis, determination of elemental composition in environmental samples by ICP-MS, Fraunhofer-Institut für Molekularbiologie und Angewandte Oekologie [*Fraunhofer Institute for molecular biology and applied ecology*], Auf dem Aberg 1, D-57392 Schmallenberg, Germany.

Coupling of the two analysis methods OES and MS makes it possible to analyze a wide range of elements. For example, lighter elements are more difficult to determine with OES. However, the simultaneous use of MS allows them to be determined. Coupling of the analysis methods is therefore required. The elemental proportions determined with the two analysis methods are consistent for the same elements, i.e., they provide consistent results within the scope of the usual measurement accuracies.

According to the invention, it is preferred that devices from Thermo Fischer with the designations iCap, iCap Duo or iCap RQ are used for the coupled ICP-OES/MS.

Determination via ICP-OES/MS makes it possible to determine impurities in the recovered $MoO_2Cl_2$, in particular metal impurities such as tungsten, in the ppb range ("parts per billion"). The ppb values or ppb limits specified herein correspond to the respective detection limit of the impurities.

The method according to the invention makes it possible to produce particularly pure $MoO_2Cl_2$, in particular makes it possible to produce $MoO_2Cl_2$ with a low tungsten content. According to the invention, it is preferred that the purity of the $MoO_2Cl_2$ recovered in step (v) is 99.99969 wt. % or more. Such pure $MoO_2Cl_2$ makes it possible to produce molybdenum-containing layers with further improved electronic properties.

According to the invention, it is further preferred that the solid $MoO_2Cl_2$ recovered in step (v) has a tungsten content, again determined by ICP-OES/MS, of $\leq 200$ ppb and particularly preferably of $\leq 50$ ppb. Tungsten as an impurity may particularly impair the electronic properties of molybdenum-containing layers. Due to the low tungsten contents according to the invention, such impairments can be avoided and the electronic properties can be further improved.

In addition to the tungsten, the $MoO_2Cl_2$ may optionally also contain very small amounts of other impurities, in particular (semi)metal impurities, such as Ag, Al, Au, B, Ba, Be, Bi, Ca, Cd, Ce, Co, Cr, Cu, Fe, Ga, Ge, Hf, In, Ir, K, La, Li, Mg, Mn, Na, Nb, Ni, Pb, Pd, Pt, Rb, Rh, Ru, Sb, Se, Sn, Sr, Te, Th, Ti, Tl, U, V, W, Zn and Zr. According to the invention, it is preferred in this case that the $MoO_2Cl_2$ recovered in step (v) has, with respect to each individual one of these impurities considered independently of one another, a content of $\leq 300$ ppb, more preferably of $\leq 200$ ppb, even more preferably of $\leq 100$ ppb, particularly preferably of 50 ppb and most preferably of $\leq 20$ ppb. Thanks to the low contents according to the invention of such impurities in the $MoO_2Cl_2$, the electronic properties of molybdenum-containing layers obtained therefrom can be further improved.

According to the invention, it is further preferred that in step (ii) the first temperature $T_1$ is $\geq 170°$ C., more preferably $\geq 170$ to $\leq 600°$ C., even more preferably $\geq 200$ to $\leq 500°$ C., particularly preferably $\geq 350$ to $\leq 450°$ C. and most preferably 400° C. Such temperatures make it possible to achieve a compromise between increased reaction rates by elevated temperatures on the one hand and unnecessary energy consumption by excessively high temperatures on the other hand. In a preferred embodiment, it is also possible for the reaction vessel to be divided into different physical and/or theoretical reaction zones in which the temperature $T_1$ is set differently within the aforementioned temperature ranges.

In step (ii), use is preferably made of a reaction vessel, the temperature of which can be controlled or regulated. For example, use is made of a rotary kiln, a static kiln, or a downpipe kiln. According to the invention, a rotary kiln is preferred which has different reaction zones that can be heated (and cooled) differently. Such a kiln makes it possible to set one or more temperature gradients in the kiln, which can contribute to a further improvement in the purity of the $MoO_2Cl_2$ produced in step (ii).

According to the invention, it is further preferred that in step (iv) the second temperature $T_2$ is $\leq 160°$ C., more preferably $\geq 10$ to $\leq 120°$ C., even more preferably $\geq 20$ to $\leq 90°$ C., particularly preferably $\geq 25$ to $\leq 70°$ C. and most preferably 70° C. Such temperatures make it possible to achieve a compromise between high yields of $MoO_2Cl_2$ and low incorporation of impurities into the $MoO_2Cl_2$ during resublimation.

According to the invention, it is particularly preferred to vary the second temperature $T_2$ between the beginning and the end of the method according to the invention. In this case, it is particularly preferred to lower the temperature $T_2$ in the receiving vessel from a higher temperature to a lower temperature, preferably from 90° C. to 20° C., more preferably from 70° C. to 25° C. Such temperature control makes it possible to set a particularly high purity of the $MoO_2Cl_2$ during the resublimation in step (iv).

In step (iv), use is preferably made of a receiving vessel, the temperature of which can be controlled or regulated. Use is for example made of a receiving flask. Alternatively, use can also be made of a cold trap on which gaseous $MoO_2Cl_2$ resublimates. The resublimated $MoO_2Cl_2$ can be removed from the receiving flask in the usual way or can be thermally detached from the cold trap.

According to the invention, it is particularly preferred that the first temperature $T_1$ and the second temperature $T_2$ are set simultaneously as specified above. Accordingly, the following temperature pairs or temperature controls are particularly preferred:

$T_1 \geq 170°$ C. and $T_2 \leq 160°$ C.;
$T_1 \geq 170$ to $\leq 600°$ C. and $T_2 \geq 10$ to $\leq 120°$ C.;
$T_1 \geq 200$ to $\leq 500°$ C. and $T_2 \geq 20$ to $\leq 90°$ C.;
$T_1 \geq 350$ to $\leq 450°$ C. and $T_2 \geq 25$ to $\leq 70°$ C.;
$T_1 = 400°$ C. and $T_2 = 70°$ C.;
$T_1 \geq 350$ to $\leq 450°$ C., and $T_2$ is 90° C. at the start of the method, and is lowered to 20° C. by the end of the method;
$T_1 = 400°$ C. and $T_2$ is 70° C. at the start of the method and is lowered to 25° C. by the end of the method.

These temperature pairs or temperature controls make it possible to achieve a compromise between increased reaction rate, reduced energy consumption, high yield and low incorporation of impurities.

According to the invention, it is also preferred for step (iii) to be carried out at a temperature of $\geq 160°$ C. Such a temperature makes it possible to prevent premature resublimation of $MoO_2Cl_2$ and thereby to increase the yield in the receiving vessel.

According to the invention, it is moreover preferred that, in step (ii), the gas flow of the $Cl_2$ is 0.01 to 1 L/min, more preferably 0.05 to 0.8 L/min. Such a gas flow makes it possible to achieve a compromise between increased reaction rate and increased yield on the one hand, and unnecessary use of chlorine with a possibly subsequent problem of disposal of unused chlorine, on the other hand.

According to the invention, it is moreover preferred that an inert gas, preferably nitrogen ($N_2$), is additionally supplied in step (ii). Such an additionally supplied inert gas, in particular $N_2$, makes it possible to carry out the method according to the invention even more safely under inert conditions. It is particularly preferred according to the invention that the gas flow of the inert gas, in particular of the $N_2$, is 0.05 to 0.4 L/min, more preferably 0.1 to 0.3 L/min and particularly preferably 0.2 L/min, wherein the choice of the gas flow depends on the kiln size and configuration and should be correspondingly adapted thereto. Such a gas flow of the inert gas, in particular of the $N_2$, makes it possible to even better maintain the inert conditions without using unnecessarily large amounts of inert gas. In addition, such a gas flow can enable improved transport of the gaseous $MoO_2Cl_2$ from the reaction vessel to the receiving vessel. In addition to $N_2$, other inert gases can also be used, for example argon (Ar). The use of Ar can lead to a further improved purity of the $MoO_2Cl_2$. According to the invention, the use of $N_2$ is most preferred due to its lower costs.

According to the invention, it is also preferred that, in step (ii), the gas flow of the $Cl_2$ is 0.01 to 1 L/min and more preferably 0.05 to 0.8 L/min and at the same time $N_2$ is supplied with a gas flow of 0.05 to 0.4 L/min and more preferably of 0.1 to 0.3 L/min (0.01 to 1 L/min of $Cl_2$ and 0.05 to 0.4 L/min of $N_2$; 0.05 to 0.8 L/min of $Cl_2$ and 0.05 to 0.4 L/min of $N_2$; 0.01 to 1 L/min of $Cl_2$ and 0.1 to 0.3 L/min of $N_2$; or 0.05 to 0.8 L/min of $Cl_2$ and 0.1 to 0.3 L/min of $N_2$). According to the invention, it is most preferred that, in step (ii), $Cl_2$ is supplied with a gas flow of 0.8 L/min and $N_2$ is supplied with a gas flow of 0.2 L/min. Such gas flows make it possible to achieve a yet further improved compromise between reaction rate, increased yield, unnecessary use of $Cl_2$ and associated disposal problems, and maintenance of the inert conditions without excessive use of inert gas and improved transport of the gaseous $MoO_2Cl_2$.

According to the invention, it is also preferred that the reaction vessel, the receiving vessel and optionally a transition region, optionally arranged between the reaction vessel and the receiving vessel, be inertized before step (i) by flushing with an inert gas, preferably nitrogen. As is generally customary, "inertization" is understood to mean setting inert conditions in an apparatus. By flushing with an inert gas, the inert conditions of the method according to the invention can be set particularly quickly and efficiently. According to the invention, it is also preferred that the method according to the invention does not comprise a step of pressure reduction, in particular does not comprise a step in which the pressure in the reaction vessel and/or in the receiving vessel is reduced.

According to the invention, it is also preferred that the $MoO_2Cl_2$ obtained in step (v) is further purified in a subsequent step (vi) by sublimation and resublimation. Alternatively, other purification methods, such as recrystallization, can also be used in a step (vi) in order to further purify the $MoO_2Cl_2$ obtained in step (v). This makes it possible to provide an $MoO_2Cl_2$ with yet further improved purity. Such an $MoO_2Cl_2$ can be converted into a particularly pure molybdenum-containing layer with improved electronic properties in a subsequent method, in particular in a method of vapor deposition. According to the invention, it is accordingly preferred that the method according to the invention does not have a step in which produced solid $MoO_2Cl_2$ is processed in a wet-chemical manner, in particular does not have a step of reacting produced solid $MoO_2Cl_2$ with aqueous ammonia. Such a reaction would typically result in the formation of hydrogen chloride (HCl). However, the formation of HCl is to be avoided according to the invention so that there are no problems with the disposal thereof and no risk of undesired corrosion of the apparatus used, including the reaction vessel and the receiving vessel, by the HCl.

The invention also relates to a method for producing a molybdenum-containing layer, which comprises a method according to the invention, wherein subsequently thereto, i.e. after step (v), or, if performed, after step (vi), the $MoO_2Cl_2$ obtained in step (v) or step (vi) is used in a vapor deposition as a precursor in order to form the molybdenum-containing layer. According to the invention, it is preferred that a chemical vapor deposition (CVD) or an atomic layer deposition (ALD) be used for the vapor deposition.

Chemical vapor deposition, or CVD, is a gas phase reaction that generally takes place at or near a surface of a substrate. Reactants involved in the reaction are fed simultaneously in the form of gases to the substrate to be coated. The substrate is arranged in a reaction chamber and is heated. The usually preheated gases are thermally activated by the heated substrate and react with each another. In the process, the desired material is deposited and chemically bonded. Chemisorption of the desired material occurs, i.e. of the molybdenum in the present invention.

The ALD process, also referred to as atomic layer deposition, is a modified CVD process. With the ALD process, the reaction or sorption at the surface ceases by itself once the surface is completely covered. This self-limiting reaction is carried out in several cycles with flushing steps in between. This makes it possible to achieve very precise layer thicknesses.

The invention also relates to $MoO_2Cl_2$ obtainable by a method according to the invention. Such $MoO_2Cl_2$ is a high-purity $MoO_2Cl_2$ and is particularly suitable as a precursor for producing high-purity molybdenum-containing layers with improved electronic properties, in particular improved storage properties, for example when used in flash memories such as a 3D-NAND. Such an $MoO_2Cl_2$ is preferably an $MoO_2Cl_2$ with a low water content, particularly preferably an anhydrous or dry $MoO_2Cl_2$.

The invention also relates to $MoO_2Cl_2$ which has a purity determined by ICP-OES/MS of 0.9996 wt. % or more and more preferably of 0.99969 wt. % or more. In this case, it is particularly preferred that the $MoO_2Cl_2$ has a tungsten content determined by ICP-OES/MS of 200 ppb, more preferably of 100 ppb and even more preferably of 50 ppb. Such an $MoO_2Cl_2$ is also a high-purity $MoO_2Cl_2$ and is particularly suitable as a precursor for producing high-purity molybdenum-containing layers with improved electronic properties, in particular improved storage properties, for example when used in flash memories such as a 3D-NAND. Such an $MoO_2Cl_2$ is preferably an $MoO_2Cl_2$ with a low water content, particularly preferably an anhydrous or dry $MoO_2Cl_2$.

The invention also relates to the use of the $MoO_2Cl_2$ obtainable or provided according to the invention as a precursor for producing a molybdenum-containing layer. In particular, the $MoO_2Cl_2$ can serve to produce a molybdenum-containing layer by means of gas-phase thin-film methods such as the CVD or ALD described above.

The invention also relates to an electronic component comprising a molybdenum-containing layer produced according to the invention. Due to the improved purity of the $MoO_2Cl_2$ provided according to the invention, the molybdenum-containing layer is likewise particularly pure and is in particular virtually to completely free of tungsten impurities. The electronic component can thus be provided with improved electronic properties.

According to the invention, it is preferred that the electronic component is what is referred to as a 3D-NAND. A 3D-NAND is a non-volatile memory ("flash memory") in which a plurality of memory cells are stacked vertically in a plurality of layers. In this case, the memory cells are connected in series. For example, 16, 32, 64, 96, or 128 memory cells can be connected in order to achieve an increased storage density. By using a molybdenum-containing layer produced according to the invention in such a non-volatile memory, the electronic properties thereof can be improved, in particular the storage properties thereof can be improved.

EXEMPLARY EMBODIMENT

A rotary kiln having a pipe length of 1 m and a pipe diameter of 5 cm is used as the reaction vessel. The rotary kiln is connected via a transition region to a product flask as receiving vessel. The rotary kiln, the transition region and the product flask can be heated separately. The rotary kiln is charged with 400 g of $MoO_2$. Subsequently, an inert gas atmosphere is created throughout the entire apparatus by introducing nitrogen (0.4 L/min of $N_2$). The rotary kiln is then brought to a temperature ($T_1$) of 400° C., the transition region is brought to a temperature of 160° C., and the product flask is brought to a temperature ($T_2$) of 70° C. After these temperatures have been reached, an $N_2$ flow of 0.2 L/min is set. Thereafter, $Cl_2$ is additionally introduced into the rotary kiln (0.8 L/min of $Cl_2$). The $MoO_2$ charge is allowed to react with the introduced $Cl_2$ for two hours (2 h). Thereafter, the introduction of $Cl_2$ and the heating of rotary kiln and transition region are terminated, and the product flask is allowed to cool to 25° C. The $N_2$ flow is increased to 1 L/min and continued for 30 min. The introduction of $N_2$ is then terminated, and the product flask is removed from the apparatus in Ar countercurrent. The product flask is fed into a glove box with an inert gas atmosphere and unpacked there.

Furthermore, a sample for determining the content of impurities is taken from the product flask. The determination in turn takes place by means of ICP-OES/MS. For this purpose, devices from Thermo Fischer with the designations iCap, iCap Duo or iCap RQ are used. The impurities indicated in Table 1 below were determined (the indicated ppb values corresponding to the respective detection limit):

TABLE 1

| Element | Content in ppb |
|---|---|
| Ag | <50 |
| Al | <50 |
| Au | <50 |
| B | <50 |
| Ba | <50 |
| Be | <20 |
| Bi | <20 |
| Ca | 100 |
| Cd | <150 |
| Ce | <50 |
| Co | <50 |
| Cr | <50 |
| Cu | <50 |
| Fe | <50 |
| Ga | <50 |
| Ge | <20 |
| Hf | <20 |
| In | <50 |
| Ir | <50 |
| K | <200 |
| La | <20 |
| Li | <20 |
| Mg | <50 |
| Mn | <20 |
| Na | <150 |
| Nb | <100 |
| Ni | <50 |
| Pb | <20 |
| Pd | <50 |
| Pt | <50 |
| Rb | <50 |
| Rh | <50 |
| Ru | <50 |
| Sb | <20 |
| Se | <50 |
| Sn | <100 |
| Sr | <50 |
| Te | <100 |
| Th | <20 |
| Ti | <200 |
| Tl | 300 |
| U | <20 |
| V | <50 |
| W | <200 |
| Zn | <50 |
| Zr | <50 |

The sum of the impurities is thus in total <3070 ppb. The $MoO_2Cl_2$ produced accordingly has a purity of at least 99.9996930 wt. %.

The invention claimed is:

1. A method for producing $MoO_2Cl_2$ under inert conditions, comprising the steps of:
   charging a reaction vessel with $MoO_2$;
   reacting the $MoO_2$ with supplied $Cl_2$ in the reaction vessel at a first temperature $T_1$ to give gaseous $MoO_2Cl_2$;
   transferring the gaseous $MoO_2Cl_2$ into a receiving vessel;
   resublimating the gaseous $MoO_2Cl_2$ in the receiving vessel to give solid $MoO_2Cl_2$ at a second temperature $T_2$ that is lower than $T_1$, wherein the second temperature $T_2$ in the receiving vessel decreases during the method for producing $MoO_2Cl_2$; and
   recovering solid $MoO_2Cl_2$ with a purity determined by ICP-OES/MS of 99.9996 wt. % or more,
   wherein the reaction vessel and the receiving vessel are excluded from pressure reduction operations.

2. The method according to claim 1, wherein solid $MoO_2Cl_2$ with a purity determined by ICP-OES/MS of 99.99969 wt. % or more is recovered.

3. The method according to claim 1, wherein solid $MoO_2Cl_2$ with a tungsten content determined by ICP-OES/MS of ≤200 ppb is recovered.

4. The method according to claim 1, wherein the first temperature $T_1$ is ≥170° C. and/or the second temperature $T_2$ is ≤160° C.

5. The method according to claim 1, wherein transferring the gaseous $MoO_2Cl_2$ into the receiving vessel is carried out at a temperature of ≥160° C.

6. The method according to claim 1, wherein the gas flow of the supplied $Cl_2$ is 0.01 to 1 L/min.

7. The method according to claim 1, wherein an inert gas is additionally supplied with the supplied $Cl_2$.

8. The method according to claim 7, wherein the gas flow of the inert gas is 0.05 to 0.4 L/min.

9. The method according to claim 1, wherein, before charging the reaction vessel with the $MoO_2$, the reaction vessel and the receiving vessel are inertized by flushing with an inert gas.

10. The method according to claim 1, wherein the recovered solid $MoO_2Cl_2$ is further purified by sublimation and resublimation.

11. A method for producing a molybdenum-containing layer, comprising a method according to claim 1, wherein subsequently the recovered solid $MoO_2Cl_2$ is used in a vapor deposition as a precursor in order to form the molybdenum-containing layer.

* * * * *